United States Patent
Liu et al.

(10) Patent No.: US 10,664,599 B2
(45) Date of Patent: *May 26, 2020

(54) PORTABLE EXECUTABLE AND NON-PORTABLE EXECUTABLE BOOT FILE SECURITY

(71) Applicant: International Business Machines Corporation, Armonk, NY (US)

(72) Inventors: Pu Liu, Vestal, NY (US); Timothy V. Bolan, Endwell, NY (US); Patrick J. Callaghan, Vestal, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/583,496

(22) Filed: May 1, 2017

(65) Prior Publication Data
US 2018/0314829 A1 Nov. 1, 2018

(51) Int. Cl.
G06F 21/00 (2013.01)
G06F 21/57 (2013.01)
H04L 9/30 (2006.01)
H04L 9/32 (2006.01)

(52) U.S. Cl.
CPC .......... G06F 21/575 (2013.01); H04L 9/30 (2013.01); H04L 9/3239 (2013.01); H04L 9/3247 (2013.01); H04L 9/3263 (2013.01)

(58) Field of Classification Search
CPC ....... G06F 21/575; H04L 9/30; H04L 9/3239; H04L 9/3247; H04L 9/3263
See application file for complete search history.

(56) References Cited

U.S. PATENT DOCUMENTS

| 8,700,895 | B1 | 4/2014 | Naguib | |
|---|---|---|---|---|
| 2006/0236122 | A1 | 10/2006 | Field et al. | |
| 2011/0191580 | A1* | 8/2011 | Iftode | G06F 21/52 713/156 |
| 2013/0305366 | A1 | 11/2013 | Lim et al. | |
| 2016/0043869 | A1* | 2/2016 | Smith | H04L 9/3247 713/176 |

(Continued)

OTHER PUBLICATIONS

List of IBM Patents or Patent Applications Treated as Related; (Appendix P), Filed Nov. 14, 2017; 2 pages.

(Continued)

*Primary Examiner* — Mohammad W Reza
*Assistant Examiner* — Michael M Lee
(74) *Attorney, Agent, or Firm* — Cantor Colburn LLP; Edward Wixted (57) ABSTRACT

A computer-implemented method for protecting a kernel for secure boot of an operating system includes preparing a kernel component with a signature for a secure boot. A processing unit modifies a machine owner key (MOK) file to include a trusted certificate. The MOK is separate from the kernel file. The processing unit validates the kernel component using a modified Grub file, a modified Shim file, and the MOK, and executes a secure boot using the validated kernel component. The kernel is unchanged by the secure boot process. The kernel component that is protected may be either a program executable (PE) file or a non-PE file.

9 Claims, 3 Drawing Sheets

(56) References Cited

U.S. PATENT DOCUMENTS

| | | | |
|---|---|---|---|
| 2016/0087801 A1* | 3/2016 | Jones | H04L 9/3247 |
| | | | 713/176 |
| 2017/0228235 A1* | 8/2017 | Choi | G06F 21/575 |
| 2017/0295195 A1* | 10/2017 | Wettstein | H04L 63/1425 |
| 2017/0364685 A1* | 12/2017 | Shah | G06F 21/53 |
| 2018/0032734 A1* | 2/2018 | Gunti | G06F 21/575 |
| 2018/0181752 A1* | 6/2018 | Guri | G06F 21/54 |

OTHER PUBLICATIONS

Pu Liu et al., "Portable Executable and Non-Portable Executable Boot File Security", U.S. Appl. No. 15/812,170, filed Nov. 17, 2017.
Initramfs—Wikipedia, "initramfs", Accessed Online: Apr. 27, 2017, 2 Pages. URL: https://en.wikipedia.org/wiki/Initramfs.
lkml.org, "Re: [RFC 1/1] ima: digital signature verification using asymmetric keys", Accessed Online: Apr. 27, 2017, 1 Page. URL: https://lkml.org/lkml/2013/1/30/68.

* cited by examiner

PORTABLE EXECUTABLE AND NON-PORTABLE EXECUTABLE BOOT FILE SECURITY

BACKGROUND

The present disclosure relates to operating systems, and more specifically, to operating system boot file security.

In Unified Extensible Firmware Interface (UEFI)-based secure boot system, one can use a GRand Unified Bootloader (Grub) command such as pesign, sbsign, or linuxefi to protect Linux kernel image or files in Portable Executable (PE) format. For example, if secure boot is enabled, the Grub command linuxefi will verify the digital signature of kernel image in PE format before loading it. One significant limitation is secure boot only works for files in PE format. Non-PE format files such as initramfs (in the example of a Linux operating system), the Grub.cfg file is vulnerable from tampering by attackers. If these non-PE files are compromised, serious security problems may arise even when secure boot is enabled on the system.

SUMMARY

According to an embodiment of the present invention, a computer-implemented method for protecting a kernel for the secure boot of an operating system is described. The method includes preparing a kernel component, via a processing unit, with a signature for a secure boot. The processing unit modifies a machine owner key (MOK) list, which is separate from the kernel. The MOK list is modified to include a trusted certificate. The processing unit then validates the kernel component using a modified Grub file, a modified Shim file, and the MOK. The processing unit executes a secure boot using the validated kernel component. The kernel is unchanged during the secure boot process.

According to other embodiments, a system for protecting a kernel for secure boot of an operating system is described. The system includes a processing unit configured to prepare a kernel component for a secure boot. The processing unit modifies a machine owner key (MOK) to include a trusted certificate. The processing unit validates the kernel component using a modified Grub file, a modified Shim file, and the MOK. The processing unit then executes a secure boot using the validated kernel component. The kernel is unchanged during the secure boot process.

According to one or more embodiments, a computer program product comprising a computer-readable storage medium is described. The computer-readable storage medium includes program instructions that are executable by a processing unit to cause a computer to perform a method for protecting a kernel for secure boot of an operating system. According to the method, a processing unit in the computer prepares a kernel component with a signature for a secure boot. The processing unit modifies a machine owner key (MOK) to include a trusted certificate. The processing unit then validates the kernel component using a modified Grub file, a modified Shim file, and the MOK. The processing unit then executes a secure boot using the validated kernel component. The kernel is unchanged during the secure boot process.

According to one or more other embodiments, a computer-implemented method for protecting a kernel for secure boot of an operating system includes modifying a machine owner key (MOK) that is separate from the kernel to include a trusted certificate, validating the kernel component using the MOK, and executing a secure boot using the validated kernel component. The kernel is unchanged after validation and booting.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In trust computing, it is essential to protect kernel images and their components from tampering by attackers. Currently, only images or files in Portable Executable (PE) format are protected by boot loaders (such as, for example, Shim and Grub files). Other important components in non-PE format such as (in the case of Linux operating systems) "initramfs" are not protected. One or more exemplary embodiments of the present invention enhance boot loaders (Shim and Grub) to protect non-PE kernel components. This method is independent of kernel itself and utilizes the more flexible Machine Owner Key (MOK) as the trusted key sources. This method also works for text configuration files such as Grub.cfg. Using Linux as an example, in the existing Grub implementation there are two commands to load the Linux kernel, one is "linuxefi" and the other is "initrdefi." The command linuxefi will validate the integrity of kernel image (which is in PE-format) and in contrast the command "initramrd" does not validate the integrity of some non-PE format kernel components such as, for example, initramfs. Embodiments of the present invention enhance non-PE format commands such as, for example, the initrdefi command to validate kernel components by using trusted certificates stored in the MOK list. Although described primarily with respect to Linux examples, because the techniques and systems described herein make changes to the Grub and Shim components of a boot sector, other non-PE format components in non-Linux operating systems also benefit from embodiments of the present invention.

Operating system boot file security is at issue in a large number of different operating systems. Using Linux as an initial example, during the startup process, the kernel is loaded by the first and second bootloaders (Grub and Shim, respectively). The kernel will mount the initial RAM file system (initramfs) and try to execute an /init script on the RAM file system. The RAM file system is an archive of the initial file system that gets loaded into memory during the Linux startup process. Usually, the /init program will load all the device drivers needed to mount the final root file system. The initial RAM disk will be destroyed after switching to the final root file system. By using a kernel component such as initramfs, some device drivers could be moved out from kernel image which results in a small kernel. More important, initramfs resolves the "chicken and egg" problem during startup process, that is, the device drivers for the particular file system are stored inside the file system itself.

Using the example of a Linux operating system, if we do not have the mechanism to protect the non-PE files, an attacker can modify the grub.cfg file and load his own initramfs which contains the malicious /init script. The /init script will be loaded by Linux kernel without security checking. The malicious /init runs as process identifier (PID) number 1, and has the privilege to perform root tasks, such as, for example, change the original root password defined on the system. The inability to protect non-PE boot files leads to serious security problems even when secure boot is enabled on the system.

There are currently several approaches that are considered for protecting initramfs via adding digital signatures by sign-file. The main conventional idea is to modify kernel code and validate the digital signature of the initramfs image. Although this approach may have a few advantages, the advantages may be overshadowed by the disadvantages. With conventional approaches to this solving the non-PE file protection problem, the sign-file attaches the signatures (together with other information used to validate it) at the end of the signed file and has no dependency to the format of the original file. The disadvantages to the conventional approaches are significant. First, the kernel has to maintain the trusted public key. Another disadvantage is that the kernel must make sure the key ring is securely maintained. If it is not maintained, the attacker can add his own public key to the key ring. As an example, it is difficult to distribute generic kernel components (e.g., initramfs) because initramfs have to be signed by the keys embedded in the Linux kernel image, and thus, users do not have the private keys to sign a customized initramfs. For the configuration file such as grub.cfg, the attached signature will fail and Grub will not load it.

As a way of addressing the above-discussed problems, instead of putting the logic in the kernel, it may be advantageous to put the logic in the first loader and the second loader (the Grub and the Shim, respectively). In one exemplary embodiment, a minimum change is made to call back to the second loader (Shim), and the Shim does a majority of the processing. In the example where the kernel component at issue is initramfs, the complex device drivers are in the initramfs and used to mount a particular file system. It may be advantageous to use a modified sign-file to sign the kernel component (e.g., initramfs) and break (i.e., separate and save) the signature part into a separate file. The file name of the signature part can be modified to contain the Secure Hash Algorithm (SHA) value of the original file content. The modified sign-file will use the signing service to sign the hash value generated from file content. The processor later adds the certificate to a Machine Owner Key (MOK) list. The MOK list is separate from the kernel, which leaves the original kernel unchanged. The boot loaders (Shim and Grub) determine which operating system will be loaded. Because operating systems (Linux, Microsoft™ operating systems, etc.) operate on top of the boot loaders, utilization of the Shim and Grub files and the MOK list, as described herein, can be applied to many types of operating systems.

Figure 4:
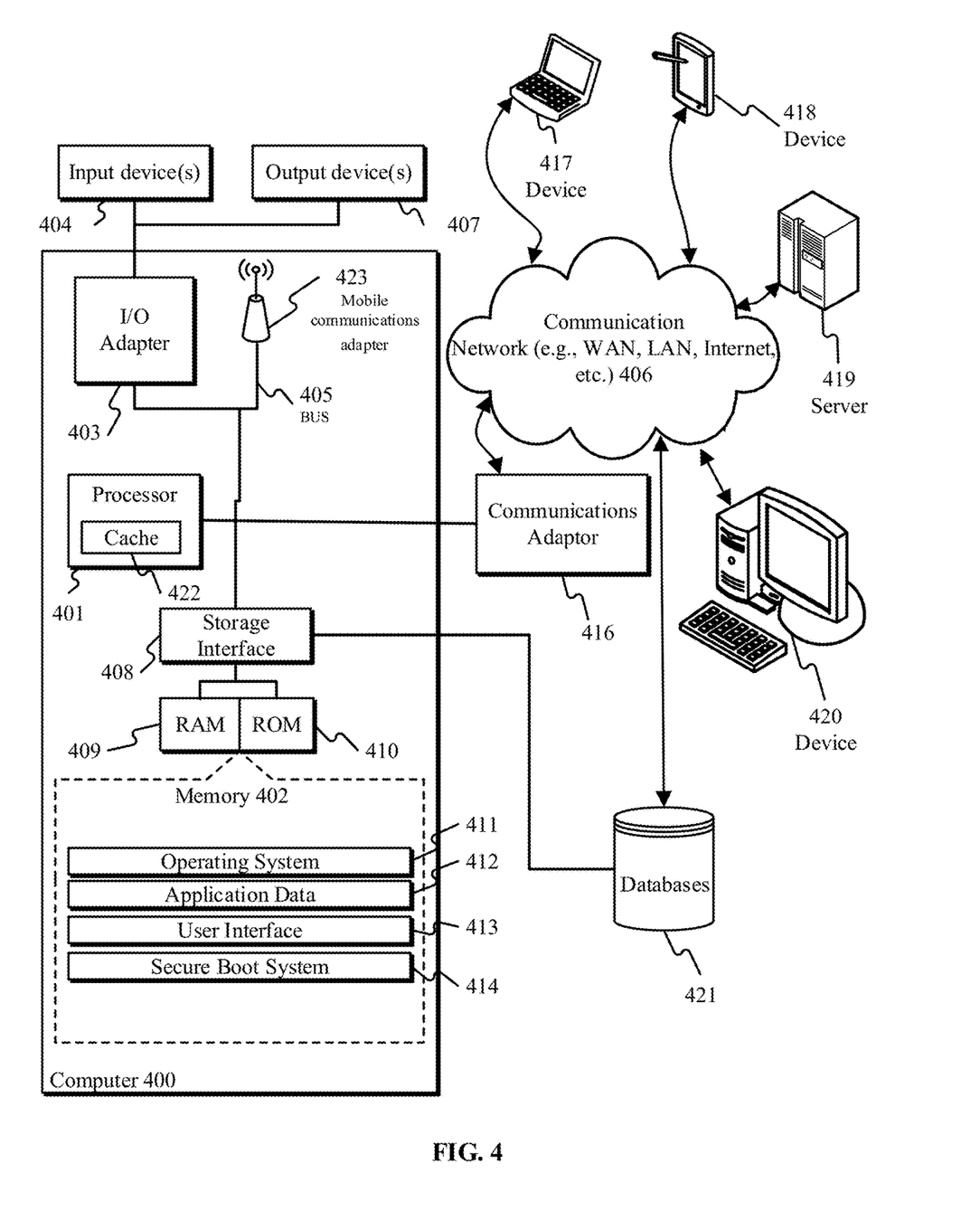
FIG. 4 depicts a block diagram of a computer system and environment according to one or more embodiments.

Because the firmware file system (FFS) is a modified piece of the kernel, hackers with malicious intent can modify the file. Accordingly, putting the protection logic in the kernel, as previously explained, can present significant security limitations. As a way of addressing the technical problem described above, FIG. 1 depicts a method 100 for protecting a kernel for secure boot of an operating system, according to one embodiment. In block 102, a system processor (e.g., processor 401 as shown in FIG. 4) may prepare a kernel component for secure boot. According to one embodiment, the kernel component may be a non-PE file format such as intramfs (when the system is running Linux operating system). In other aspects, the kernel component may be a PE file format. Accordingly, in one exemplary embodiment, preparing the kernel component includes creating, via the processor, a signature for a kernel component, and breaking the signature into a file that is separate from the kernel, and storing that separate file in an operatively connected computer memory. In this way, the processor is configured to protect both of a kernel component that is a portable executable (PE) format and a kernel component that is a non-portable executable (non-PE) format. Processor 401 executes the modified sign-file which talks to (e.g., communicates with) an operatively connected signing server to create a signature. The signature does not include the trusted certificate. The signing server (e.g., server 419 as shown in FIG. 4) will use the private key stored on a crypto card on the signing server to create the signatures. More particularly, the signing server generally uses native application program interface (API) to access the crypto card on the signing server. The client device (e.g., processor 401 on computer 400) uses the web service API to sign the kernel component, and the signing server provides the Representational state transfer (RESTful) web service API. According, processor 401 uses the RESTful web service API, via communication network 406 (FIG. 4) to obtain the signature for the kernel component.

Figure 1:
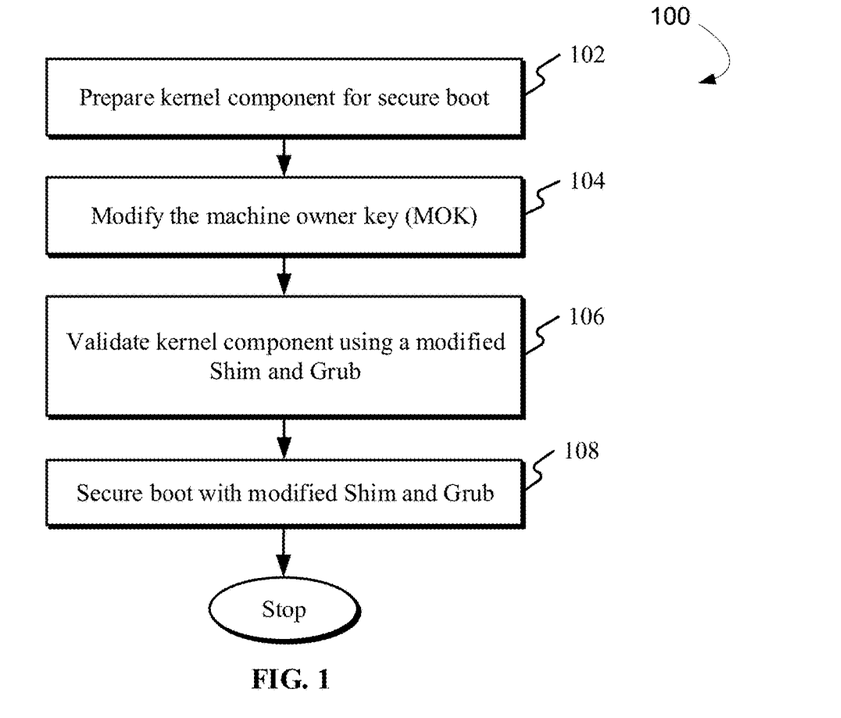
FIG. 1 depicts a method protecting a kernel for secure boot of an operating system is described according to one or more embodiments.

In block 104, according to one embodiment, processor 401 is configured to modify a machine owner key (MOK). A Machine Owner Key (MOK) is a type of key that a user device (e.g., computer 400 as shown on FIG. 4) generates and uses to sign an Extensible Firmware Interface (EFI) binary. The point of a MOK is to give users the ability to run locally-compiled kernels, boot loaders not delivered by the distribution maintainer, and so on. According to one embodiment, modifying the MOK includes downloading the trusted certificate associated with the kernel component from a signing server and adding the trusted certificate (which includes the public key) to the MOK list. Accordingly, processor 401 downloads the trusted certificate and adds the created signature file together with the kernel component (e.g., the initramfs) to the MOK list in the boot media (e.g., the boot sector of memory 402 as shown in FIG. 4). Processor 401 then uses the downloaded trusted certificate (containing a public key) to validate the kernel component for authenticity and to determine that it has not been maliciously altered.

In block 106, processor 401 validates the kernel component using the modified Shim and Grub, and if the kernel component is properly validated, processor 401 performs a secure boot with the modified shim and grub, as shown in block 108.

Figure 2:
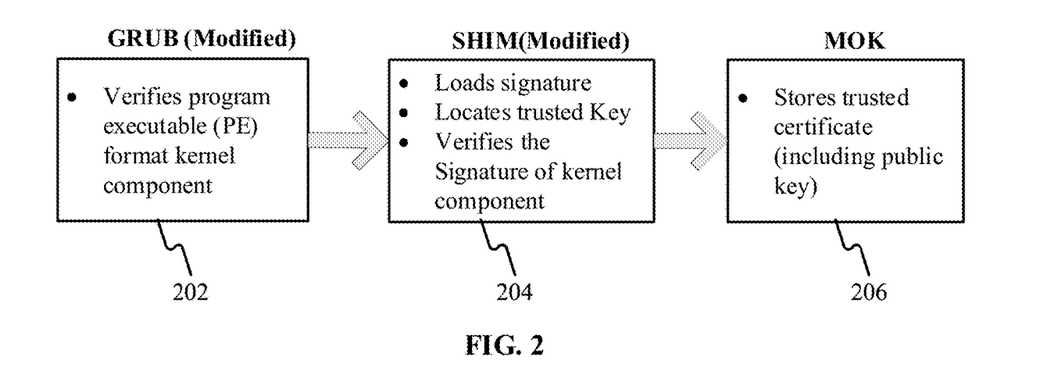
FIG. 2 depicts a block diagram of operational elements of a system for secure boot of an operating system according to one or more embodiments.

FIG. 2 depicts a block diagram of a modified Grub file 202, a modified Shim file 204, and Machine Owner Key (MOK) list 206 for a system for secure boot of an operating system, according to one embodiment. Referring now to FIG. 2, according to some aspects described below in further detail, during the validation step shown in block 106, the Grub file 202 may be configured to talk back to the Shim file to verify the signature, and processor 401 will configure a new (modified) Shim file 204 that is modified to verify PE file contend and/or non-PE file content. First, modified Shim 204 is configured by processor 401 to search the MOK list to locate the certificate. In some aspects, the key identification (key-ID) may also be used to locate the certificate. The system then uses the certificate to verify the signature, and thus, secure the non-PE secure boot files. Because the certificates are stored in a separate file from the original kernel, the original kernel remains unaltered. Accordingly, the above elements are applicable to secure PE boot file formats and non-PE secure boot file formats alike by utilizing the MOK list 206, while leaving the original kernel unchanged.

Figure 3:
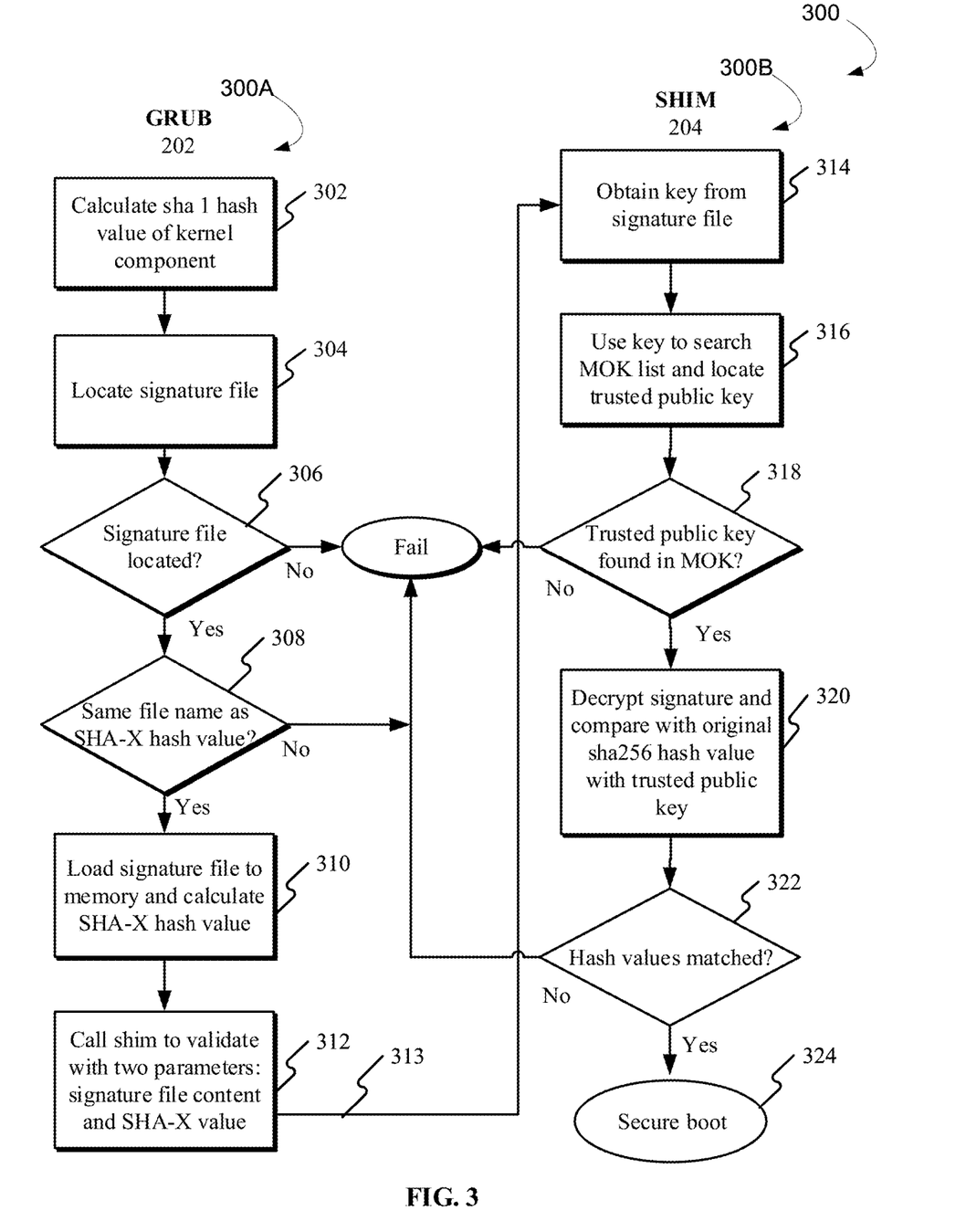
FIG. 3 depicts a method validating a kernel component according to one or more embodiments.

Considering the validation process (e.g., as shown in block 106) in greater detail, FIG. 3 depicts a flow diagram of a method 300 for validating the kernel component, according to one exemplary embodiment. Referring now to FIG. 3, FIG. 3 depicts a method 300 validating a kernel component, according to one embodiment. As shown in FIG. 3, validation is performed by two main components, namely a modified Grub file 202 (also referred to herein as "Grub 202" or "modified Grub 202") and a modified Shim file 204 (also referred to as "Shim 204" or "modified Shim 204"). Modified Grub 202 is shown in FIG. 3 to performs the Grub steps 300A, and the modified Shim 204 is shown to perform modified Shim steps 300B. At a high level, modified Grub file 202 verifies the kernel component and passes the request (depicted in FIG. 3 as request 313) to the modified Shim file 204, where the modified Shim 204 finds the public key, decrypts the signature as shown in block 320, and validates the signature. Accordingly, modified Grub 202 and modified Shim 204 use the public key that was stored in the MOK to validate the signature file, and modified Shim 204 performs the secure boot if all values are verified.

Now in greater detail, referring first to Grub steps 300A, starting in block 302, Grub 202 calculates the Secure Hash Algorithm X (SHA-X) value of the kernel component. Because versions of the SHA security encryption standard are periodically released over time (e.g., SHA-1 family of hash algorithms, SHA-2 family of hash algorithms, etc.), the hash value is generally referred to herein as "SHA-X."

As shown in block 304, grub 202 locates the signature file in the MOK list 206. Processor 401, via grub 202, determines whether the signature file is located at decision block 306. If the file is not located, the boot fails. Responsive to determining that the signature is located in the file system, processor 401 determines whether the file names match, as shown in decision block 308. By changing the file name to match the SHA-X hash value, an additional level of security is implemented that ensures that the kernel component at issue has not been subject to malicious tampering. If the file name does not match, processor 401 fails the secure boot.

At block 310, if the hash value matches the file name, grub 202 loads the signature file to memory (e.g., memory 402 as shown in FIG. 4) and calculates the SHA-X hash value. For example, in the case of a 256-bit system, the SHA-256 algorithm (or its generational equivalent) generates a unique, fixed size 256-bit (32-byte) hash. As shown in block 312, modified Grub 202 executes a call (or "request") 313 to modified Shim file 204 to validate the kernel component with the two verified parameters (the signature file content and the SHA values).

As shown in block 314, the modified Shim file 204 obtains a key from the signature file by parsing the signature file content to get the key identification (key-ID) used to create the signature. At block 316, modified Shim 204 uses the key to search the MOK list 206 and locate the trusted public key stored there at block 104 (FIG. 1).

At decision block 318, processor 401 (via Shim 204) determines whether the trusted public key is found in the MOK, and responsive to finding the trusted public key, processor 401 decrypts the signature and compares the signature with the original SHA hash value with the trusted public key. If the trusted public key was not found by the modified Shim file 204, the secure boot fails.

At decision block 322, responsive to an affirmative determination that the hash values are matched, modified Shim 204 performs the secure boot as step 324. If the hash values did not match, the secure boot fails, which prevents malicious code from propagating throughout the system.

Those skilled in the art appreciate that as SHA encryption standard evolves, other versions of Secure Hash Algorithm for this calculating step can be used. Accordingly, SHA-2 family standard hash algorithms such as SHA-256, among others, are readily replaced by additional iterations of standard cryptographic hash functions. Any reference to particular SHA functions are exemplary only and are not meant to be limiting.

Moreover, although Linux operating system file names are used as an example, it is appreciated that embodiments of the present invention may be applied to other operating systems having secure boot procedures.

Embodiments described herein provide several advantages over conventional secure boot systems. Embodiments can be advantageous to the operating speed and security of current operating systems of computer processing systems by improving the performance of the computing system, and more particularly, by increasing speed and secure operation of the processor by preventing malicious code from being introduced into the computing system. More particularly, a greater range of secure boot file types can be supported for all types of operating systems using Shim and Grub files for the boot operations. For example, embodiments described herein provide a generic way to protect both PE and non-PE files in operating systems. As another advantage, the verification is done by Grub and Shim, and there is no change to the operating system kernel. Another advantage of one or more embodiments is that the system uses the MOK list to maintain trusted keys. The MOK list is advantageous because trusted keys are secure than those stored in the kernel itself as in conventional systems. Another advantage of the presently described architecture is that there is a separation of content and their digital signatures for text files like Grub.cfg.

FIG. 4 illustrates a block diagram of an exemplary computing environment and computer system 400 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 400, therefore, can embody a general-purpose computer. In another exemplary embodiment, the implementation can be part of a mobile device, such as, for example, a mobile phone, a personal data assistant (PDA), a tablet computer, etc.

As shown in FIG. 4, the computer 400 includes processor 401. Computer 400 also includes memory 402 communicatively coupled to processor 401, and one or more input/output adapters 403 that can be communicatively coupled via system bus 405. Memory 402 can be communicatively coupled to one or more internal or external memory devices via a storage interface 408. Communications adapter 416 can communicatively connect computer 400 to one or more networks 406. System bus 405 can communicatively connect one or more user interfaces via input/output (I/O) adapter 403. I/O adapter 403 can connect a plurality of input devices 404 to computer 400. Input devices can include, for example, a keyboard, a mouse, a microphone, a sensor, etc. System bus 405 can also communicatively connect one or more output devices 407 via I/O adapter 403. Output device 407 can include, for example, a display, a speaker, a touchscreen, etc.

Processor 401 is a hardware device for executing program instructions (aka software), stored in a computer-readable memory (e.g., memory 402). Processor 401 can be any custom made or commercially available processor, a central processing unit (CPU), a plurality of CPUs, for example, CPU 401a-401c, an auxiliary processor among several other processors associated with the computer 400, a semiconductor based microprocessor (in the form of a microchip or chip set), or generally any device for executing instructions. Processor 401 can include a cache memory 422, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 422 can be organized as a hierarchy of more cache levels (L1, L2, etc.).

Processor 401 can be disposed in communication with one or more memory devices (e.g., RAM 409, ROM 410, one or more external databases 421, etc.) via a storage interface 408. Storage interface 408 can also connect to one or more memory devices including, without limitation, one or more databases 421, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 402 can include random access memory (RAM) 409 and read only memory (ROM) 410. RAM 409 can be any one or combination of volatile memory elements (e.g., DRAM, SRAM, SDRAM, etc.). ROM 410 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 402 can incorporate electronic, magnetic, optical, and/or other types of non-transitory computer-readable storage media. Memory 402 can also be a distributed architecture, where various components are situated remote from one another, but can be accessed by processor 401.

The instructions in memory 402 can include one or more separate programs, each of which can include an ordered listing of computer-executable instructions for implementing logical functions. In the example of FIG. 4, the instructions in memory 402 can include an operating system 411. Operating system 411 can control the execution of other computer programs and provides scheduling, input-output control, file and data management, memory management, and communication control and related services.

The program instructions stored in memory 402 can further include application data 412, and instructions for output to a user interface 413. Program instructions further include a secure boot system 414, configured to perform one or more embodiments described herein.

I/O adapter 403 can be, for example but not limited to, one or more buses or other wired or wireless connections. I/O adapter 403 can have additional elements (which are omitted for simplicity) such as controllers, microprocessors, buffers (caches), drivers, repeaters, and receivers, which can work in concert to enable communications. Further, I/O adapter 403 can facilitate address, control, and/or data connections to enable appropriate communications among the aforementioned components.

I/O adapter 403 can further include a display adapter coupled to one or more displays. I/O adapter 403 can be configured to operatively connect one or more input/output (I/O) devices 407 to computer 400. For example, I/O 403 can connect a keyboard and mouse, a touchscreen, a speaker, a haptic output device, or other output device. Output devices 407 can include but are not limited to a printer, a scanner, and/or the like. Other output devices can also be included, although not shown. Finally, the I/O devices connectable to I/O adapter 403 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 400 can include a mobile communications adapter 423. Mobile communications adapter 423 can include GPS, cellular, mobile, and/or other communications protocols for wireless communication.

In some embodiments, computer 400 can further include communications adapter 416 for coupling to a network 406.

Network 406 can be an IP-based network for communication between computer 400 and any external device. Network 406 transmits and receives data between computer 400 and devices and/or systems external to computer 400. In an exemplary embodiment, network 406 can be a managed IP network administered by a service provider. Network 406 can be a network internal to an aircraft, such as, for example, an avionics network, etc. Network 406 can be implemented in a wireless fashion, e.g., using wireless protocols and technologies, such as WiFi, WiMax, etc. Network 406 can also be a wired network, e.g., an Ethernet network, an ARINC 429 network, a controller area network (CAN), etc., having any wired connectivity including, e.g., an RS232 connection, R5422 connection, etc. Network 406 can also be a packet-switched network such as a local area network, wide area network, metropolitan area network, Internet network, or other similar type of network environment. The network 406 can be a fixed wireless network, a wireless local area network (LAN), a wireless wide area network (WAN) a personal area network (PAN), a virtual private network (VPN), intranet or other suitable network system.

Network 406 can operatively connect computer 400 to one or more devices including device 417, device 418, and device 420. Network 406 can also connect computer 400 to one or more servers such as, for example, server 419.

If computer 400 is a PC, workstation, laptop, tablet computer and/or the like, the instructions in the memory 402 can further include a basic input output system (BIOS) (omitted for simplicity). The BIOS is a set of routines that initialize and test hardware at startup, start operating system 411, and support the transfer of data among the operatively connected hardware devices. The BIOS is typically stored in ROM 410 so that the BIOS can be executed when computer 400 is activated. When computer 400 is in operation, processor 401 can be configured to execute instructions stored within the memory 402, to communicate data to and from the memory 402, and to generally control operations of the computer 400 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for protecting a kernel for secure boot of an operating system comprising:
 a memory in communication with a processing unit, the processing unit being configured to:
  prepare a kernel component for a secure boot;
  modify a machine owner key (MOK) that is separate from the kernel, wherein the MOK is modified to include a trusted certificate by downloading the trusted certificate comprising a public key from a signing server and adding the trusted certificate to the MOK;
  validate the kernel component using a modified GRand Unified Bootloader (Grub) file, a modified Shim file, and the MOK;
  and execute a secure boot using the validated kernel component, wherein the kernel is unchanged, wherein the processing unit is configured to protect both of the kernel component that is an executable format and the kernel component that is a non-executable format, wherein the executable format is a portable executable (PE) format and the non-executable format is a non-portable executable (non-PE) format.

2. The system of claim 1, wherein processing unit is configured to prepare the kernel component by:
 creating a signature for a kernel component by receiving the kernel component from a signing server, wherein the kernel component is signed by a private key stored on the signing server; and
 storing the signature into a file that is separate from the kernel.

3. The system of claim 2, wherein the processing unit is further configured to modify a file name of the kernel component to contain a secure hash algorithm (SHA) value of an original file content of the file.

4. The system of claim 1, wherein the processing unit is configured to validate the kernel component using the modified Grub by:
 adding a validation code to the modified Grub to validate the kernel component;
 referencing the Shim file to verify the signature; and
 verifying contents of the kernel component via the Shim.

5. The system of claim 4, wherein the processing unit is configured to reference the Shim file to verify the signature by:
 searching a MOK list to locate the certificate;
 responsive to locating the certificate in the MOK list, verifying the signature via the certificate.

6. A computer program product for protecting a kernel for secure boot of an operating system, the computer program product comprising a non-transitory computer readable storage medium having program instructions embodied therewith, the program instructions executable by a processing unit to cause the processing unit to perform a method comprising:
 preparing a kernel component with a signature for a secure boot;
 modifying a machine owner key (MOK) that is separate from the kernel, wherein the MOK is modified to include a trusted certificate downloading the trusted certificate comprising a public key from a signing server and adding the trusted certificate to the MOK;
 validating the kernel component using a modified GRand Unified Bootloader (Grub) file, a modified Shim file, and the MOK; and
 executing a secure boot using the validated kernel component, wherein the kernel is unchanged, wherein the processing unit is configured to protect both of a kernel component that is an executable format and a kernel component that is a non-executable format, wherein the executable format is a portable executable (PE) format and the non-executable format is a non-portable executable (non-PE) format.

7. The computer program product of claim 6, wherein preparing the kernel component comprises:
 creating, via the processing unit, a signature for a kernel component by receiving the kernel component from a signing server, wherein the kernel component is signed by a private key stored on the signing server; and
 storing the signature into a file that is separate from the kernel.

8. The computer program product of claim 7, further comprising modifying a file name of the kernel component to contain a secure hash algorithm (SHA) value of an original file content of the file.

9. The computer program product of claim 6, wherein validating the kernel component using the modified Grub comprises:
 adding a validation code to the modified Grub to validate the signed kernel component;
 referencing the Shim file to verify the signature; and
 verifying, via the processing unit, contents of the kernel component via the Shim.

* * * * *